United States Patent [19]

Gould et al.

[11] 3,933,166

[45] Jan. 20, 1976

[54] ALTITUDE COMPENSATED VACUUM REGULATING VALVE

[75] Inventors: Richard H. Gould; George Ludwig, both of Troy; William J. Walters, Milford; Remy J. VanOphem, Sterling Heights, all of Mich.

[73] Assignee: The Bendix Corporation, Southfield, Mich.

[22] Filed: Mar. 17, 1975

[21] Appl. No.: 559,182

Related U.S. Application Data

[62] Division of Ser. No. 468,859, May 10, 1974.

[52] U.S. Cl. ............ 137/102; 123/117 A; 137/109; 251/61.4

[51] Int. Cl.² ............................................ G05D 7/00

[58] Field of Search ........ 137/102, 109; 123/117 A; 251/61.3, 61.4

[56] References Cited

UNITED STATES PATENTS

| | | | |
|---|---|---|---|
| 3,157,168 | 11/1964 | Sterner et al. | 123/117 A |
| 3,491,735 | 1/1970 | Walker | 123/117 A |
| 3,698,366 | 10/1972 | Gropp | 123/117 A |
| 3,780,713 | 12/1973 | Julian | 123/117 A |

FOREIGN PATENTS OR APPLICATIONS

| | | | |
|---|---|---|---|
| 10,355 | 4/1948 | Germany | 251/61.4 |

*Primary Examiner*—William R. Cline
*Assistant Examiner*—H. Jay Spiegel
*Attorney, Agent, or Firm*—R. J. VanOphem; R. J. Eifler

[57] ABSTRACT

An altitude compensated vacuum control system for regulating the vacuum servo mechanism of an internal combustion engine of the type having a distributor with a vacuum servo controlled advance mechanism incorporating a positive stop for maximum spark advance, a carburetor to provide a source of vacuum to operate said vacuum servo mechanism and a vacuum control valve assembly for regulating the vacuum servo mechanism of said distributor. The vacuum control valve assembly receives a spark port vacuum signal from the carburetor to maintain a predetermined vacuum spark advance as the engine begins to accelerate. Upon attaining the predetermined vacuum spark advance and at a given speed, the control assembly becomes operative to sum the initial first predetermined level vacuum signal to a secondary altitude compensated vacuum source signal, which is a function of an engine operating parameter, thereby causing the vacuum servo spark advance mechanism in the distributor to obtain a maximum spark advance by moving to a positive stop within the distributor. This full vacuum advance is maintained independent of the degradation of the vacuum signals as a result of changes in altitude, provided the spark port signal is greater than the full vacuum spark advance signal.

1 Claim, 6 Drawing Figures

ALTITUDE COMPENSATED VACUUM REGULATING VALVE

This is a division of application Ser. No. 468,859, filed May 10, 1974.

CROSS-REFERENCES TO RELATED APPLICATIONS

The present invention relates, in general, to an internal combustion engine vacuum controlled spark advance system. The present invention is related to a nonlinear vacuum spark advance system described in co-pending, commonly assigned U.S. application Ser. No. 329,289 entitled "Nonlinear Vacuum Spark Advance System", filed Dec. 2, 1973.

BACKGROUND OF THE INVENTION

A major source of atmospheric air pollution is the exhaust gas from automobile engines. A present approach to control this general problem is to modify engine operation parameters through spark timing control systems to alter combustion characteristics of the internal combustion engine, thereby reducing exhaust emissions at the disadvantage of loss of economy and performance.

Most prior art vacuum spark advance control systems have some sort of a vacuum servo controlling the advance or retard setting of the engine distributor as a function of carburetor spark port vacuum to provide good engine performance as well as fuel economy during the difference operating conditions of the engine. These vacuum servos, in their simplest form, generally consist of a housing divided into atmospheric pressure and vacuum chambers by a flexible diaphragm connected to the distributor breaker plate. The diaphragm and breaker plate are normally spring biased to the lowest advance or retard spark timing setting, and carburetor spark port vacuum normally urges the diaphragm in a spark timing advance direction upon opening of the carburetor throttle valve corresponding to increasing engine speed.

With the above construction, during rapid acceleration, the drop-in vacuum at the carburetor spark port permits atmospheric pressure acting in the opposing chamber of the distributor's servo to immediately move the distributor breaker plate to a lower advance setting (retarding the spark), that is, a setting that is best to meet engine performance requirements. On the other hand, however, upon return to normal operation and gradual reacceleration or deceleration of the engine, an increase in vacuum at the carburetor spark port causes an immediate return movement of the vacuum servo diaphragm thereby causing a higher engine spark timing advance. This provides a longer burning time for the fuel mixture before the optimum top or near top dead center position of the piston is attained, generally providing the most desirable economic operation. However, this longer time permits the build-up of higher combustion temperatures and pressures, which are undesirable insofar as the production of oxides of nitrogen and other undesirable elements of exhaust emissions are concerned. It can be seen, therefore, that the conventional spark timing control system generally provides good performance and fuel economy, but does not necessarily minimize the output of undesirable exhaust gas emissions.

Other systems are known such as the type shown in U.S. Pat. No. 3,606,871 which created an improvement over the aforementioned devices. The above-mentioned patent shows a vacuum regulated mechanical device which includes a one-way check valve and an orifice in parallel flow circuits connected between the carburetor spark port and the vacuum servo mechanism. During rapid vehicle accelerations, the check valve unseats to provide a quick equalization of the pressure at the servo to the spark portion vacuum thereby lowering the spark advance setting to avoid detonation. Detonation is pre-ignition spark knock or ping and is a result of spontaneous ignition of the explosive gasoline-air mixture which under certain circumstances occurs in the cylinders of the internal combustion engine. Detonation reduces power output, causes overheating, unduly stresses the cylinder head and pistons, and is generally objectionable from the noise and vibration standpoint. Upon a momentary deceleration condition of operation, with the subsequent return toward former operating conditions, the orifice provides a slow build-up of the vacuum level at the servo to equal that at the spark port so that the advance setting only slowly returns to normal. This results in lower peak combustion temperatures and pressures and a lower emission level of engine pollutants. However, the above-referenced system is poor for fuel economy. The slower spark advance build-up due to the orifice bleed of vacuum causes late combustion of air-fuel mixture and this combustion is generally at a point past optimum efficiency, i.e., into the expansion cycle of the engine.

An even later patent, U.S. Pat. No. 3,698,366, overcame the disadvantageous function of the device described in U.S. Pat. No. 3,606,871 by providing a rapid return of the spark timing advance setting to essentially the former level, after a momentary deceleration, to improve the fuel economy.

The prior art described above utilizing vacuum as a control means has the additional disadvantage of suffering from a degraded performance as a result of changes in altitude as well as high vehicle speed. Commonly assigned U.S. Pat. application Ser. No. 329,289 entitled "Nonlinear Vacuum Spark Advance System", filed Dec. 2, 1973, provides a partially altitude compensated vacuum control for the distributor vacuum spark advance system. Compensation is accomplished by using a predetermined value of spark advance at moderate and low speeds using the spark port vacuum as a first signal source. At higher speeds this system provides a switching function to a secondary signal source of vacuum, namely, the EGR signal. The second signal source vacuum is then utilized to control or regulate the distributor servo vacuum spark advance. This secondary vacuum signal source utilized to regulate the distributor at higher speeds does not offer altitude compensation. Therefore, at high vehicle speeds and at increased altitudes, this valve does not have the capability of maintaining a full vacuum advance due to the degradation of the EGR vacuum signal, as altitude changes.

The approach discussed in the prior art devices in providing a spark advance vacuum signal to the distributor has resulted in significant reduction in fuel economy as well as a significant drop in the level of performance of the internal combustion engine. All automobile internal combustion engines suffer degraded performance when operated at higher speeds and at higher altitudes due to the continuous reduction in the spark port vacuum signal which was heretofore provided directed to the vacuum spark advance diaphragm mechanism. Some altitude compensation has been provided at low speeds by limiting the spark advance at a predetermined level at low and moderate speeds and then switching to a non-altitude compensated vacuum signal, namely, the EGR signal, thereby effectively providing a limited amount of altitude compensation at low and moderate speeds. At higher speeds, however, none of the prior art devices offer a regulated altitude compensated signal to provide an altitude compensated spark advance vacuum signal to the distributor vacuum servo.

BRIEF SUMMARY OF THE INVENTION

The invention is an altitude compensated nonlinear vacuum spark advance control system which provides a means to regulate and control the distributor vacuum spark advance substantially independent of degradation of the vacuum signal due to higher speed operation or altitude at which the vehicle is operated. The altitude compensated nonlinear vacuum spark advance control system disclosed herein is insensitive to spark vacuum above a predetermined level and also controls the level of overcompensation obtainable at high speed operation. Also, the spark advance control system disclosed creates characteristic curves indicating that the optimum spark advance is obtainable regardless of the altitude at which the engine is operated and regardless of the degradation of the spark port vacuum signal due to high speed operation.

The invention is characterized by a vacuum control assembly which receives a first signal which is a function of air flow through the carburetor and provides an output second signal to the distributor vacuum advance servo mechanism at or below a first predetermined level. Further means are utilized for sensing a second vacuum source signal corresponding to an engine parameter related to either engine air flow or vehicle speed. This second source signal is then summed to the first predetermined signal to provide an input signal to the distributor vacuum advance servo mechanism, whereby the full vacuum spark advance on the distributor vacuum servo mechanism is obtainable at sea level and is maintained independent of changes in altitude of the vehicle.

It is, therefore, a primary object of the invention to provide an altitude compensated engine spark advance system that offers the advantage of increased fuel economy, while minimizing the disadvantages of a degradated distributor spark advance signal at high altitudes and high speed operation.

It is another object of this invention to provide an engine spark advance control mechanism which provides a controlled increasing altitude compensated vacuum control signal to the engine distributor breaker plate mechanism at high engine speed, thus preventing detonation, thereby resulting in better engine performance as well as a reduction in the emission of exhaust pollutants.

It is another object of this invention to provide an engine spark advance control system which utilizes the presently available carburetor spark port and a secondary vacuum source related to an engine parameter to overcome the degraded engine performance formerly caused by the exclusive use of carburetor spark port vacuum.

It is a further object of this invention to provide a vacuum control assembly for regulating a spark advance mechanism of an internal combustion engine distributor which is responsive to air flow through the engine, and by means of a vacuum sensitive valve is operative to provide a vacuum control signal to the distributor which is a function of carburetor spark port and a secondary source of engine vacuum relating to an engine parameter.

It is still another object of this invention to provide a vacuum control assembly for regulating the spark advance of an internal combustion engine's distributor which includes a servo-controlled mechanism utilizing an internal mechanical stop to limit the maximum spark advance setting to a predetermined level.

Another object of this invention is to provide an altitude compensated nonlinear vacuum spark advance system for controlling an internal combustion engine's distributor breaker plate servo mechanism by including a servo-operated cutoff valve between the carburetor spark port and distributor which is primarily sensitive to distributor vacuum so that any vacuum leakage in the distributor circuit will be compensated by periodically reopening the cutoff valve.

It is still a further object of this invention to provide a vacuum control assembly for regulating the spark advance of an internal combustion engine distributor which provides full advance on the distributor at a lower vacuum level than prior art control systems without causing preignition spark knock during acceleration.

It is still a further object of the present invention to provide an improved engine spark timing control apparatus which provides spark advance as the engine speed increases and which in the event of a sudden hard acceleration provides a means for lowering the spark advance setting rapidly to avoid engine detonation.

It is still a further object of the present invention to provide an altitude compensated engine spark vacuum advance system which offers improved performance of the internal combustion engine at high speed operation as well as improved fuel economy over its total range of operation and at the same time provides a reduced level of engine emission pollutants.

Other objects, features, and advantages of the invention will become apparent from the description which follows taken in conjunction with the accompanying drawings which show a preferred embodiment of the invention.

DETAILED DESCRIPTION OF THE DRAWINGS

Figure 1:
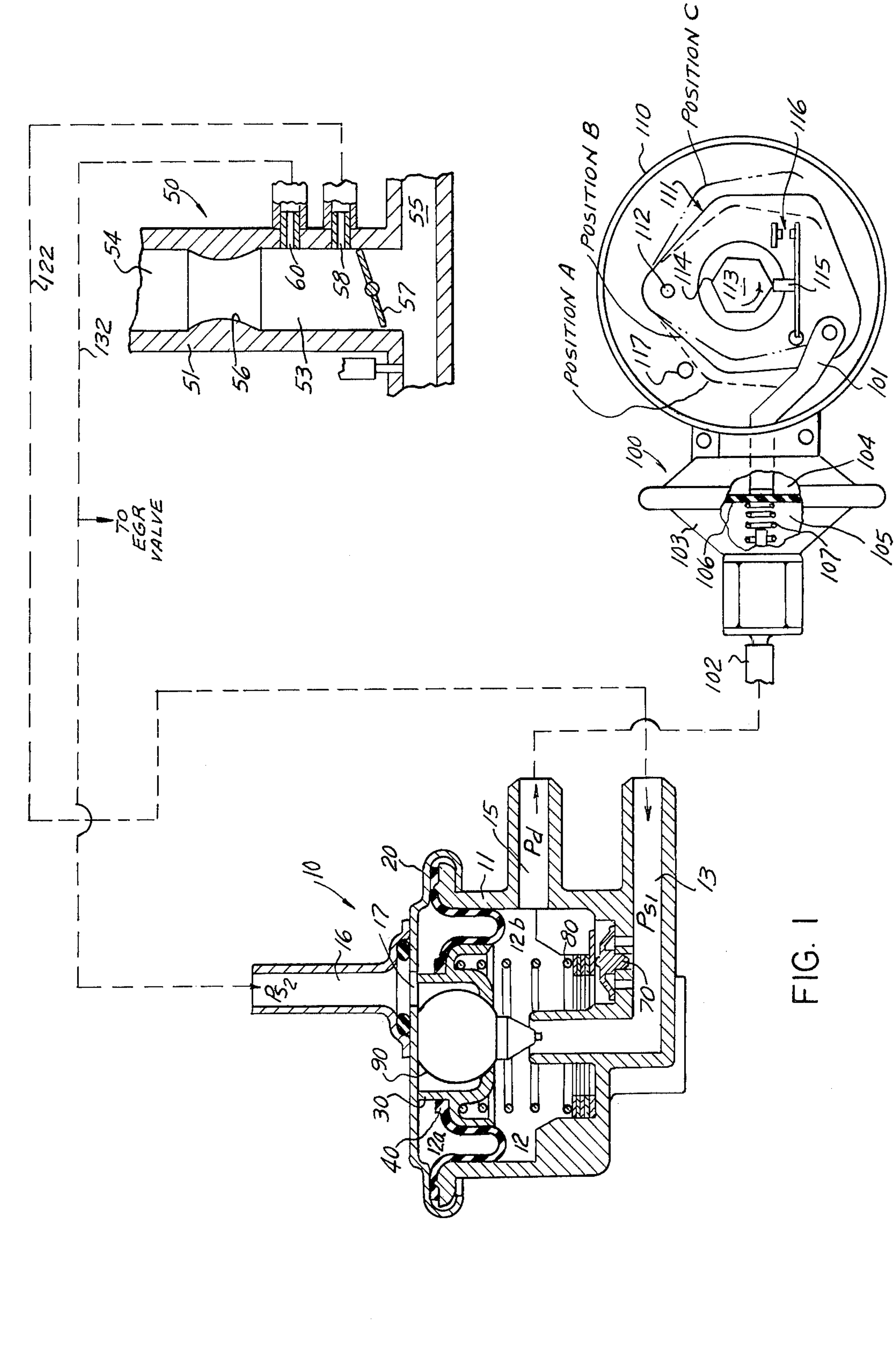
FIG. 1 schematically illustrates a partial cross-sectional view of an engine spark advance system embodying a preferred embodiment of the invention.

FIG. 1 shows, schematically, only those portions of an internal combustion engine that are normally associated with the engine distributor spark advance control system. The altitude compensated nonlinear vacuum spark advance control system is comprised of an engine air-flow sensing means, such as a carburetor 50, a vacuum servo-controlled distributor 100 to provide the movement of the distributor breaker plate 111, and a control valve assembly 10 which regulates the vacuum control servo mechanism. The spark advance control system also includes a second means for sensing a vacuum signal which is a function of at least one engine operating parameter. The sensing means responsive to an engine operating parameter provides an output signal to the control valve assembly. The second sensing means for providing a vacuum signal selected for the preferred embodiment as illustrated in FIG. 1, is the Recirculated Exhaust Gas (EGR) vacuum tap 60 on the carburetor. The second source signal can also be generated by obtaining a vacuum signal from the intake manifold or any other portion of the internal combustion engine where a vacuum is generated during the operation of the internal combustion engine. Further, the second source of vacuum can be obtained by utilizing an electrically-operated switch related to speed of the engine to actuate a vacuum actuator thereby providing a vacuum signal to the control assembly. For purposes of the discussion of the preferred embodiment, the EGR vacuum signal is selected as the secondary source of vacuum. It is understood that throughout the discussion of the description of the altitude compensated nonlinear vacuum spark advance control system any vacuum source, electrically-operated switching means, or pressure means, can be used providing a vacuum signal in place of the EGR signal.

Carburetor 50 is shown as being of the down draft type having a typical air-fuel induction passage 53 with an atmospheric air-inlet 54 at one end and mounted to the engine's intake manifold 55 at the opposite end. Induction passage 53 contains the typical fixed area venturi 56 and a throttle valve 57. The throttle valve is rotatably mounted on the lower portion of the carburetor body across passage 53 in such manner as to control the flow of air-fuel mixture into the intake manifold. Fuel is inducted in the venturi area of the carburetor passage from a nozzle, (not shown), projecting into or adjacent venturi 56. Throttle valve 57 is shown in the engine idle speed position substantially closing induction passage 53 and is rotatable to a substantially vertical position essentially unblocking passage 53. A spark port or static tap 58 is provided at a point just above the idle position of throttle valve 57. Port 58 is traversed by throttle valve 57 as it rotates to unblock passage 53. The vacuum or pressure level at spark port 58 will vary as a function of the rotational movement of the throttle valve, spark port 58 reflecting essentially atmospheric pressure upon closure of the throttle valve. The vacuum available at spark port 58 as the throttle valve 57 opens, is characterized by curves S and $S^1$ in FIG. 6 where vacuum is plotted against vehicle speed. Spark port 58, therefore, serves as a vacuum sensor.

An exhaust gas recirculation (EGR) port 60 is provided in the induction passage 53 of carburetor body 51 between the venturi 56 and the spark port 58, a predetermined distance above the idle speed position of throttle valve 57. The vacuum sensed at EGR port 60 is characterized by curves E and $E^1$ of FIG. 6. It is important to note that the selection of the EGR vacuum signal source in the preferred embodiment of the invention is not intended to limit the use to only the EGR signal as a secondary source vacuum. It is understood that any vacuum characteristic signal relating to any engine operating parameter such as intake manifold or spark port pressure, can be used in place of the EGR vacuum signal. As illustrated in FIG. 1, the vacuum sensed at EGR port 60 is also used to control the diaphragm actuator of an internal combustion engine's exhaust gas recirculation valve (not shown) in a known fashion.

As previously indicated, the distributor 110 shown in FIG. 1 includes a breaker plate 111 that is rotatably mounted at pivot 112 on a stationary portion of the distributor and movable with respect to cam 113. Cam 113 has a plurality of peaks (114) equal to the number of cylinders of the engine. The preferred embodiment illustrates a six cylinder engine configuration corresponding to the number of engine cylinders. Each of the peaks co-operates with the follower 115 of a breaker point set 116 to make or break the spark connection in a normal manner for each 1/6, in this case, rotation of cam 113. Pivotal movement of breaker plate 111 in counter-clockwise spark retard setting direction, or in a clockwise spark advance setting direction is provided by an actuator 101 slidably extending from vacuum servo 100. A maximum advance stop 117 is placed at a predetermined position with respect to the movement of breaker plate 111 so that the maximum spark advance obtainable occurs when breaker plate 111 moves into contact with stop 117. If the force generated by actuator 101 on breaker plate 111 is greater than that required to move breaker plate 111 into contact with 117 no physical movement of breaker 111 beyond stop 117 will occur. Therefore, only the maximum spark advance setting on the distributor is controlled mechanically, independent of the maximum vaccum signal characteristic applied across diaphragm 106.

Servo 100 is of conventional construction and has a hollow housing 103 whose interior is divided into an atmospheric pressure chamber 104 and a vacuum chamber 105 by an annular flexible diaphragm 106. The diaphragm is fixedly secured to actuator 101, and is biased in a rightward retard direction by compression spring 107. Chamber 104 has an atmospheric or ambient pressure vent, not shown, while chamber 105 is connected by a passage, not shown, to conduit 102.

During engine-off and other operating conditions to be described, atmospheric pressure exists on both sides of diaphragm 106, permitting spring 107 to force the actuator 101 to the lowest advance or a spark retard setting position, position C in FIG. 1. Application of vacuum to chamber 105 moves diaphragm 106 and actuator 101 toward the left to an engine spark advance position until the maximum advance is obtained as breaker plate 111 comes into contact with stop 117, position A. The number of degrees of advance is a function of the change in vacuum level in actuator chamber 105. The calibration of spring 107 is determined by taking into consideration the desired response from full spark retard to full spark advance as well as the nature of the signal used to actuate the servo mechanism.

Although only a single diaphragm servo 100 is illustrated, it will be clear that it is within the scope of the invention to connect conduit 102 to the primary or advance chamber of the dual diaphragm servo of the type which is commonly known in the art.

Figure 2:
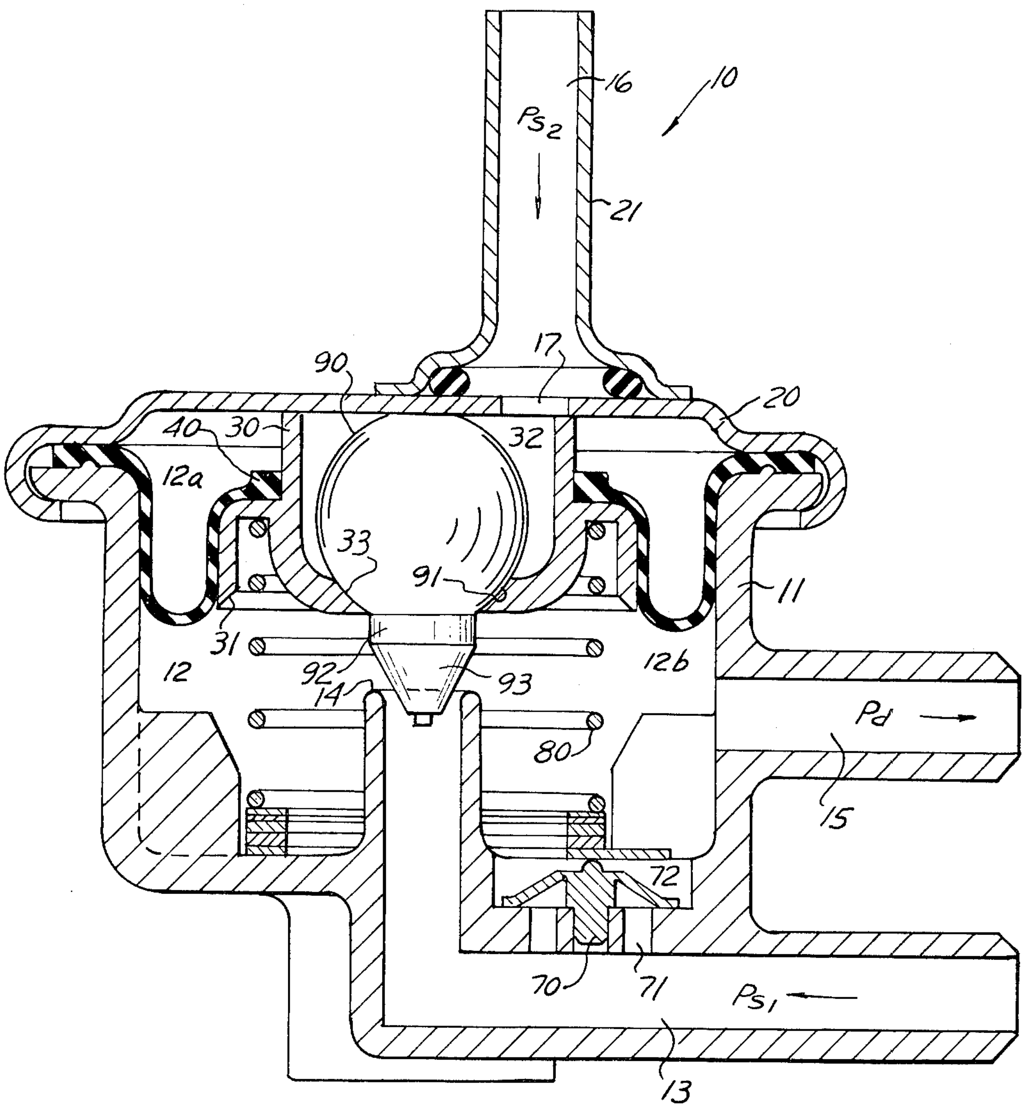
FIG. 2 is a cross-sectional view of the altitude compensated control valve assembly.

Referring now to FIG. 2, the control valve assembly 10 of the altitude compensated nonlinear vacuum spark advance control system is shown. The control valve housing 11 has a cavity 12 with the open end adapted to receive cover 20 with diaphragm 40 mounted thereinbetween. The cover is secured to the housing by any suitable means such as staking. Disposed within cavity 12 and fixedly secured to diaphragm 40 is a control valve member 30. Diaphragm 40 and control valve member 30 divide cavity 12 into two separate chambers 12a and 12b.

Figure 3:
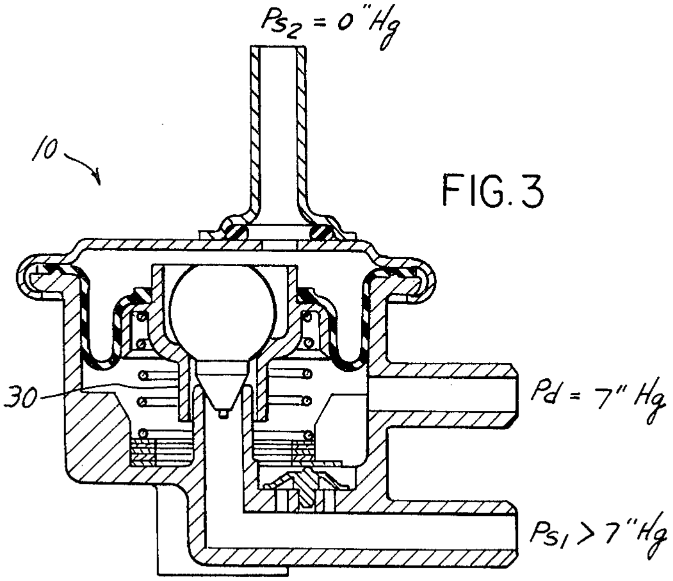
FIG. 3 is a cross-sectional view of the altitude compensated nonlinear vacuum advance valve components when the distributor vacuum has reached a first predetermined level.

Control valve member 30 is adapted to receive on one end spring member 80 and adapted to stop against cover 20 on the other opposite end. Control member 30 has a central passage 32 with one end portion having a narrowed inside diameter adapted to provide a valve seat 33. Disposed within passage 32 is a ball check valve 90 having a first portion 91 which seats on valve seat 33 and a narrowed end portion 92 extending into chamber **12*b* and providing a valve seat 93 on one end of the narrowed end portion 92 of said ball check valve. An alternate embodiment of control valve member 30** is shown in FIG. 3.

Housing chamber **12*b* is adapted to receive the first pressure signal, Ps1, and by means of passage 13 and conduit passage 122 (shown in FIG. 1), chamber 12*b* communicates with spark port 58 in carburetor 50. One end of conduit passage 13 extends into chamber 12*b* and is adapted to provide valve seat 14. Housing chamber 12*b* is also adapted to provide an output signal Pd and by means of passage 15 and conduit passage 102 (shown in FIG. 1), chamber 12*b* communicates with chamber 105 of vacuum servo 100 in the distributor. Housing chamber 12*a* is adapted to receive the second pressure signal, Ps2, and by means of passages 16 and 17, conduit 21, mounted to cover 20 by any suitable means, and conduit 132 (shown in FIG. 1), chamber 12*a* communicates with a second source of vacuum to receive a vacuum signal, which is a function of an engine operating parameter. The second signal source, as described in this embodiment is the EGR valve port 60 in induction passage 53 of carburetor 50**.

Housing chamber **12*b* further communicates with passage 13 through passage 71 and a second cavity 72 formed at the bottom of cavity 12. Cavity 72 is adapted to receive check valve 70 which permits air-flow through passage 71 in a first direction and prevents air-flow from chamber 12*b* to passage 13 through passage 71** in a second direction.

OPERATION OF PREFERRED EMBODIMENT

Prior to starting the engine, the distributor vacuum servo chambers 104 and 105, control valve assembly chambers **12*a* and 12*b* and induction passage 53 of the carburetor 50, as shown in FIG. 1, are equalized and essentially at atmospheric pressure. Control valve member 30 is biased against cover 20 by spring member 80 causing ball check valve body portion 90 to seat on valve seat 33 and to unseat the extended ball check valve body portion 93 from valve seat 14. When the engine is started and assumes an idle speed, conduit 122, passage 13, chamber 12*b*, passage 15, and conduit 102 complete a circuit from the carburetor spark port 58 directly to the distributor servo vacuum chamber 105. At idle speed, however, throttle valve 57 is closed as shown in FIG. 1 and therefore breaker plate 111 is at its least spark advance position or at a retard setting, designated by phantom lines position C in FIG. 1**.

Figure 6:
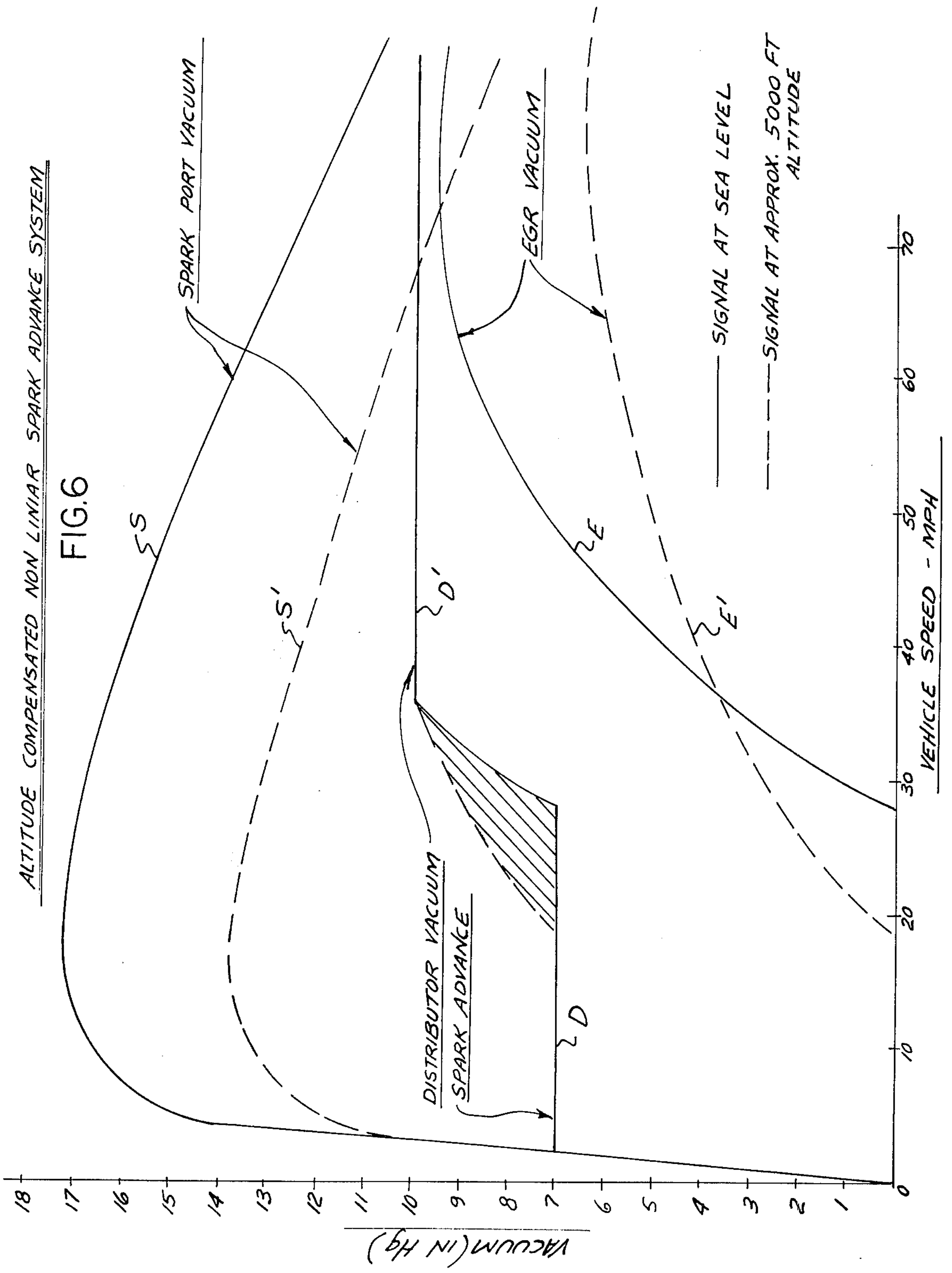
FIG. 6 graphically illustrates different operating conditions of the altitude compensated nonlinear vacuum advance system shown in FIG. 1.

As the vehicle begins to accelerate and throttle valve 57 opens and begins to traverse spark port 58, a vacuum signal is applied to the distributor servo diaphragm 106 through the above-described circuit and the breaker plate 111 is moved into a spark advance setting under the influence of actuator 101. As soon as a sufficient vacuum level is reached to overcome the force of spring 80, diaphragm 40 and control valve member 30 will begin to move downward toward valve seat 14 until ball check valve body portion 93 seats on valve seat 14. The vacuum level required to overcome spring force 80 will vary depending upon the size of the internal combustion engine used since engines having greater displacements can generate higher vacuum characteristics. The level of vacuum necessary to seat ball check valve body portion 93 against valve seat 14 will be maintained at a predetermined level. Should any leakage occur in the distributor vacuum circuit, this predetermined level of vacuum in chamber **12*b* is maintained by ball check valve body portion 93 opening sufficiently under the influence of spring 80 to compensate for the loss in vacuum, due to leakage, and thereby resupply the vacuum necessary to maintain ball check valve body portion 93 against valve seat 14 at this predetermined level. The condition of the control valve described above is illustrated in FIG. 3 and this condition will be maintained providing that chamber 12*a* remains at atmospheric pressure and Ps1 remains greater than the force necessary to overcome the spring force generated by compression of spring 80. The distributor spark advance signal Pd, as illustrated by curve D, FIG. 6, is thereby maintained at this predetermined level (7 inches of mercury) and will continue at this predetermined level until the force balance across diaphragm 40** is somehow altered.

As the engine continues to accelerate and throttle valve 57 continues to open, a vacuum signal is eventually created at EGR port 60 and this vacuum signal is communicated through conduit 132 and passages 16 and 17 to chamber **12*a* of the control valve assembly. The presence of a vacuum signal in chamber 12*a* causes the balance across diaphragm 40 to become upset thereby causing ball check valve body portion 93 to be moved in a direction away from valve seat 14. As a signal Ps2 increases and ball check valve body portion 93 moves away from valve seat 14, the spark port signal Ps1 is permitted to communicate with chamber 12*b* thereby increasing Pd and maintaining the predetermined vacuum level across diaphragm 40 until Ps2 reaches a maximum valve whereupon ball check valve body portion 93 again seats against valve seat 14. For example, as illustrated in FIG. 3, ball check valve body portion 93 will seat against valve seat 14 when chamber 12*b* is at a vacuum level of 7 inches of mercury. As Ps2 increases, Ps1 will be at some level greater than Ps2. Therefore, if Ps2 increase to 5 inches of vacuum, ball check valve body portion 93 will move away from valve seat 14 to permit 5 inches of additional vacuum signal Ps1 to enter chamber 12*b* so that a vacuum differential between chambers 12*b* and 12*a* of 7 inches of mercury is always maintained. Of course, the vacuum signal, Pd, present in chamber 12*b* is also present in distributor vacuum servo chamber 105, thereby permitting actuator 101 and breaker plate 111 to be moved in a position of greater spark advance or in other words toward maximum spark advance stop 117. As Ps2 continues to increase to a maximum value ball check valve body portion 93 will continue to unseat and maintain the predetermined vacuum differential across diaphragm 40. The continual unseating of ball check valve body portion 93 increases Pd thereby indicating the vacuum in vacuum chamber 105 and causing breaker plate 111 to be continually moved in a spark advance position toward maximum spark advance stop 117. Once distributor breaker plate 111 reaches maximum advance stop 117 the vacuum in chamber 105 will continue to increase but will not generate any additional spark advance since breaker plate 111** cannot pivot any further. Note, the predetermined level of spark advance will always be maintained on the distributor breaker plate regardless of the degradation of the spark port signal due to changes in altitude or the degradation of the EGR port vacuum signal due to changes in altitude. Therefore, the control valve assembly maintains a full vacuum advance on the distributor independent of the effects of the spark port signal or the secondary vacuum source signal like the EGR signal as a result of changes in altitude providing the spark port signal is greater than the maximum spark advance vacuum.

Figure 4:
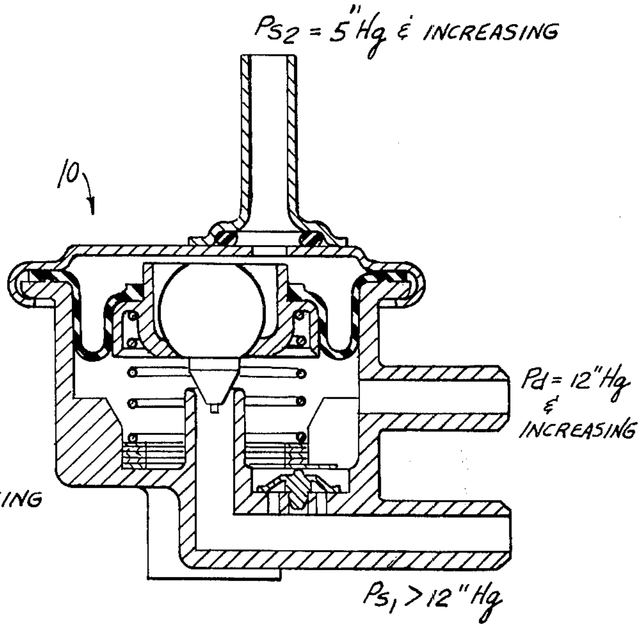
FIG. 4 is a cross-sectional view of the altitude compensated nonlinear vacuum advance valve components when the secondary source vacuum is increasing.

As the vehicle continues to accelerate, the vacuum signal at EGR port 60 continuously increases, thereby causing Pd to increase without any further effect on spark advance since breaker plate 111 has reached the maximum spark advance stop 117. The condition as described is indicated by FIG. 4 where the spark port signal is greater than 12 inches and increasing and the EGR port signal, Ps2, is 5 inches of mercury and increasing resulting in a distributor port vacuum advance signal Pd which is 12 inches of mercury and increasing, full vacuum advance having been obtained at 10 inches of vacuum, as illustrated by curve $D^1$ in FIG. 6. This condition will be maintained until the engine reaches a steady state operation or until Ps1 degradates at very high speeds to a value lower than the maximum full vacuum advance signal equivalent to the breaker plate 111 position against maximum full advance stop 117.

When the vehicle is operating at a steady-state speed and suddenly is subject to a heavy or wide open throttle acceleration, a relatively unrestricted flow of air at substantially atmospheric pressure is permitted to return the spark setting to a normal lower spark advance position to avoid detonation. This is accomplished by check valve 70 in passage 71. When throttle plate 57 is wide open for full acceleration the spark port signal Ps1 approaches substantially atmospheric pressure. The pressure differential across check valve 70 as a result of the presence of a relatively high vacuum in chamber **12*b* and substantially atmospheric pressure in passage 13 causes check valve 70 to unseat and permit air to flow toward distributor chamber 105 when Pd drops to 7 inches of mercury vacuum, valve body portion 93 moves away from seat 14 and allows additional air flow towards the distributor through passage 13. The pressure in chamber 105 approaches atmospheric pressure which is equivalent to the chamber 104 pressure thereby causing distributor breaker plate 111** to be actuated to a lower advance setting or a retard position preventing engine detonation.

Figure 5:
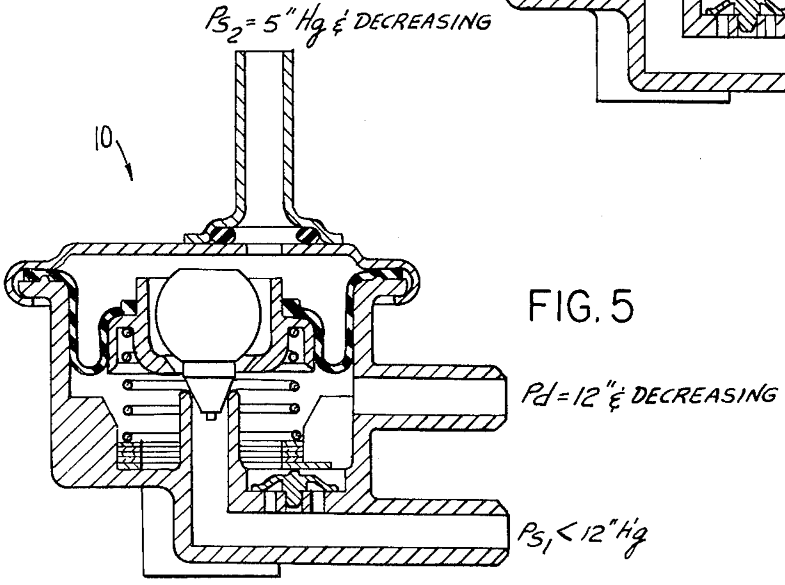
FIG. 5 is a cross-sectional view of the altitude compensated nonlinear vacuum advance valve components when the distributor vacuum has reached maximum advance or full advance and the secondary source vacuum is decreasing.

When the vehicle is decelerating from a steady-state speed, the spark port vacuum as well as the EGR port vacuum decreases, indicating a need for a lower spark advance setting at this lower speed. This is accomplished by causing ball check valve body portion 91 to move away from valve seat 33 permitting air to flow through passage 32 into chamber **12*b* resulting in a decrease of vacuum in chamber 12*b* or chamber 105 of distributor servo 100, as illustrated in FIG. 5. The decrease in vacuum in chamber 105 causes actuator 101 to move breaker plate 111 to a lower spark advance position or retard position. This condition will continue until the EGR port vacuum becomes substantially atmospheric and chamber 12*b* vacuum is no longer sufficient to maintain a force across diaphragm 40 to overcome spring force 80, thereby unseating ball check valve body portion 93 from valve seat 14 and permitting Ps1 signal to be communicated to chamber 12*b* and distributor servo vacuum chamber 105. Again, it is emphasized that instead of using the EGR port vacuum to supply a vacuum source signal Ps2, any other vacuum source can be used, providing it is a function of an engine parameter. An electrical source could also be used to actuate a vacuum actuator, which in turn supplies the second vacuum signal in place of using the EGR port vacuum. For example, manifold vacuum can be used as Ps2 and the altitude compensated nonlinear vacuum spark advance system can be operated equally as well through use of manifold vacuum. An electrical switch operated by a sensor can also be used in conjunction with a vacuum actuator which would in turn supply the secondary source vacuum to permit the vacuum spark advance valve to perform the same functional characteristic as described in this application. Further, an orifice restricted passage can be designed into passage 16 so that the application of Ps2 can be regulated and controlled to move from the predetermined vacuum level to the full vacuum advance level. This can be better seen in FIG. 6**, which graphically represents the operation of the invention.

Although only one preferred embodiment showing the functional application of the invention has been illustrated in the accompanying figures and description in the foregoing specification, it is especially understood that various changes may be made to the embodiment shown and described without departing from the spirit and the scope of the invention as will now be apparent to those skilled in the art. For example, by connecting conduit 122 in FIG. 1 to manifold 55, Ps1 is now representative of manifold vacuum. Further, by connecting conduit 132 to spark port 58, Ps2, now represents spark port vacuum. With the control valve so connected, a regulated vacuum spark advance signal is provided to the distributor during closed throttle idle conditions when the spark port vacuum is vented to atmosphere or near zero. This application of the altitude compensated nonlinear vacuum spark advance control valve results in elimination of excessive engine roughness at idle by using the regulation features of the valve to provide a limited spark advance at idle and permit a full spark advance when the throttle is opened.

Accordingly, it is intended that the illustrative and descriptive materials herein be used to illustrate the principles of the invention and not to limit the scope thereof.

We claim:

1. A vacuum regulating valve comprising:

a cup shaped housing having a cavity with one open end and an opposite closed end, said housing including:

a first conduit disposed within said cavity, said conduit having one end portion extending into said cavity through said opposite closed end of said housing, an opposite end portion protruding from said cup shaped housing, and a first passage communicating with said cavity, said one end portion of said conduit having a first valve seat, said opposite end portion adapted to receive a vacuum source signal;

a second conduit passage having one end portion protruding from said housing cavity and a second passage adapted to communicate with said housing cavity, said one end portion adapted to provide an output signal;

a third passage disposed in said opposite closed end, one end of said passage communicating with said cavity and an opposite end communicating with said first passage of said first conduit;

an annular member coaxially disposed in said cavity, said member having a central passage with one end portion having a narrowed inside diameter adapted to provide a second valve seat and an opposite end portion having an inside diameter larger than said one end inside diameter, said one end portion also having an annular groove coaxially disposed with respect to said central passage;

a circular diaphragm having an outside diameter portion and an inside diameter portion, said outside diameter portion adapted to be mounted to the open end of said housing cavity and said inside diameter portion adapted to be mounted to said annular member, whereby the cavity within said housing is separated into a first and second pressure chamber;

a cover member adapted to be mounted over the open end of said housing cavity and the outside diameter portion of the diaphragm, said cover having a passage adapted to communicate with the central passage of said annular member;

means for biasing said annular member a predetermined amount in a first direction toward said cover, said means disposed between said opposite closed end of said housing cavity and said annular groove in one end of the annular member, whereby the force generated by the biasing means moves said annular member in said first direction against said cover member;

a fourth conduit passage coaxially disposed with said second passage through said cover member, said conduit having one end extending in a direction away from the open end of said cavity, an opposite end portion adjacent said cover and means for mounting said opposite end to said cover member;

an umbrella-shaped check valve disposed in said third passage of the cup shaped housing, said check valve adapted to permit air flow in a direction from said first passage to said cavity and to prevent air flow in a second opposite direction; and a ball-check valve body disposed within the central passage of said annular member, said body having a first portion which seats on said second valve seat on the narrowed end portion of said annular member central passage and a second portion extending beyond said second valve seat into said first chamber in the direction of said first valve seat on said one end of said first conduit.

* * * * *